United States Patent
Spurlin et al.

[15] 3,703,236
[45] Nov. 21, 1972

[54] VIBRATOR MOUNTING

[72] Inventors: William V. Spurlin; Patrick J. Carroll, both of Indiana, Pa.

[73] Assignee: FMC Corporation, San Jose, Calif.

[22] Filed: July 31, 1970

[21] Appl. No.: 59,975

[52] U.S. Cl. ............... 209/326, 74/61, 198/220 DB, 209/366.5
[51] Int. Cl. ............................................. B07b 1/34
[58] Field of Search...209/365, 366, 366.5, 367, 325, 209/326; 74/61, 87; 198/220 DB

[56] References Cited

UNITED STATES PATENTS

| | | | |
|---|---|---|---|
| 3,583,553 | 6/1971 | Spurlin et al. | 198/220 DB |
| 3,203,264 | 8/1965 | Evans | 74/61 |

Primary Examiner—Frank W. Lutter
Assistant Examiner—William Cuchlinski, Jr.
Attorney—F. W. Anderson and C. E. Tripp

[57] ABSTRACT

A mounting for a rotary vibrator exciter for a two mass vibratory system wherein the rotary vibrator is mounted within a rectangular tubular frame which is connected to the structure to be vibrated by means of elastomeric blocks positioned on both of the horizontal and the vertical sides of the frame. By variation of the number, sizes, placement or compression of the elastomeric blocks the transmitted vibratory force component in the vertical and horizontal directions can be independently adjusted in order to obtain the desired vibratory motion in the vibrated structure and the desired natural frequency of vibration of the vibratory system.

16 Claims, 5 Drawing Figures

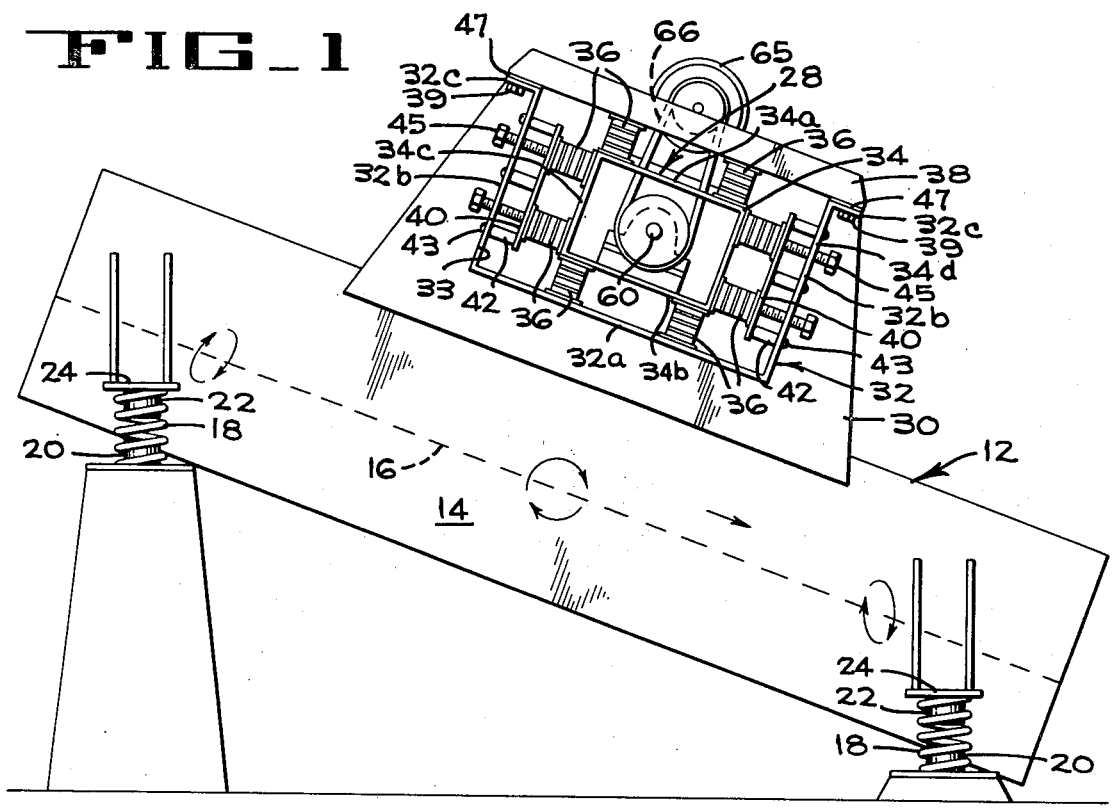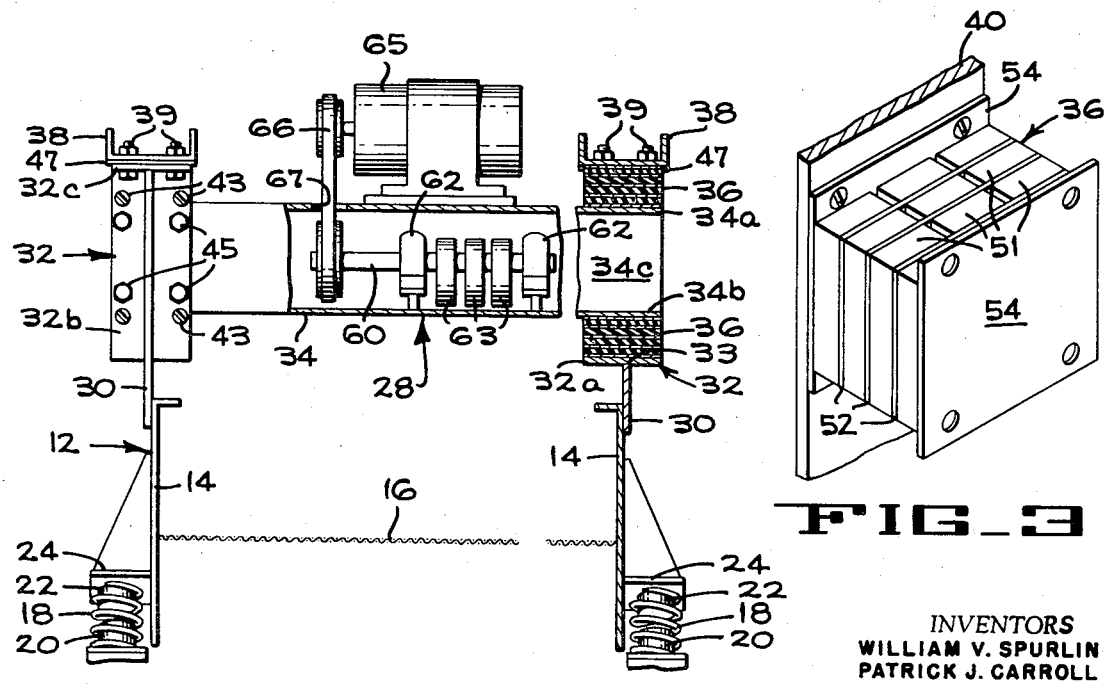

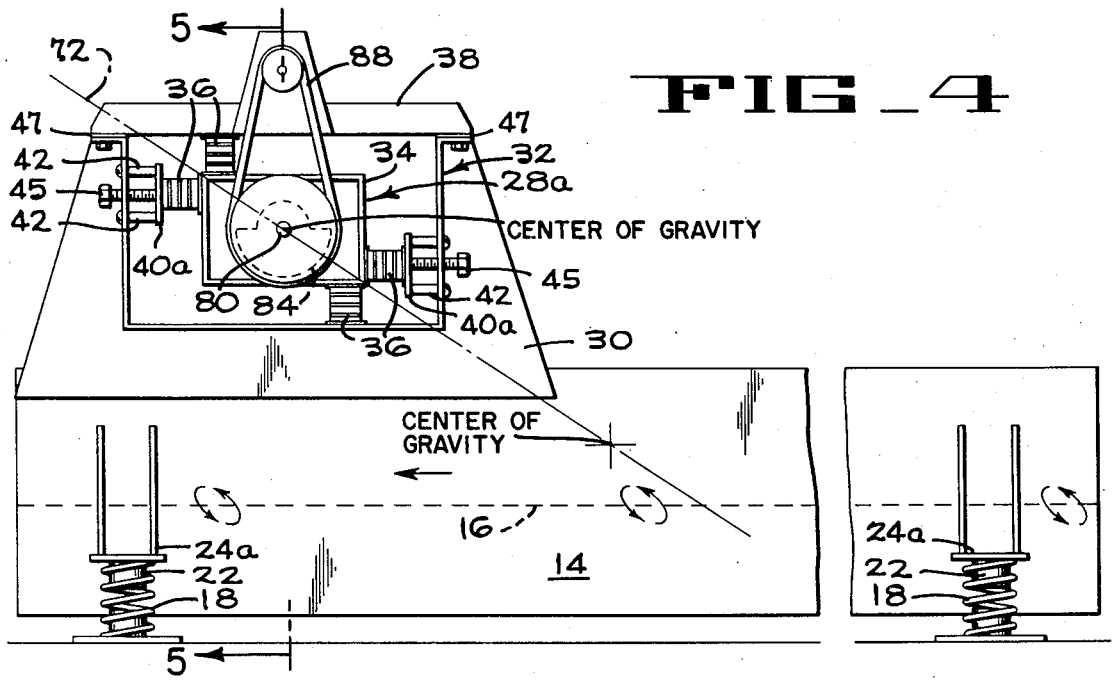
FIG_4
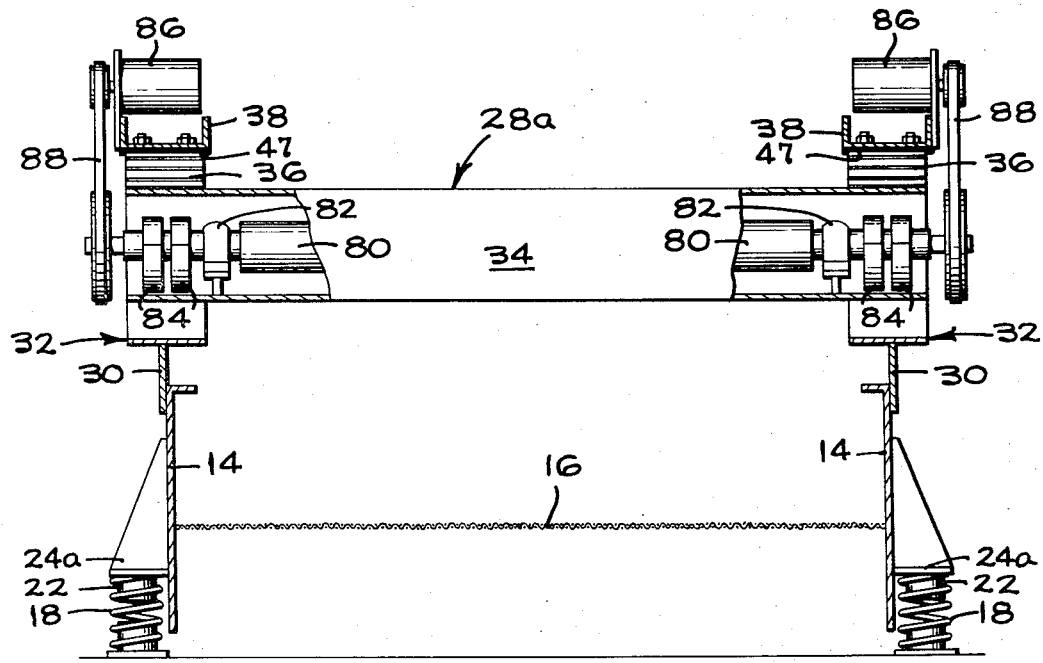
FIG_5

VIBRATOR MOUNTING

BACKGROUND OF THE INVENTION

1. Field of the Invention

The present invention pertains to vibrator mounting structures and more particularly it pertains to a mounting for a rotary type vibrator used to excite a two mass vibratory system.

2. Description of the Prior Art

Rotary vibrators have been used for many years in the industrial field for vibrating screens, feeders, conveyors and separators for example. These vibrators typically are comprised of a rotating shaft having one or more eccentric weights attached thereto for generating a rotating force vector through the bearings which support the shaft and connect it with the surrounding structure.

By far the most common method of mounting such rotary vibrator structures upon the object to be vibrated is the so-called "brute force" system. In such a system the vibrator supporting structure is mounted directly to the object to be vibrated so that the rotating force vector, such as might be transmitted from an eccentrically weighted shaft, will be passed directly through the supporting bearings to the feed conveyor or screen, etc., in which a vibratory motion is desired. There are two common problems with which this typical method of mounting a rotary vibrator is afflicted. First, the vibratory stroke may vary under varying load conditions, and secondly, the direction of the vibratory motion is limited by the manner in which the vibrator is connected to the vibrated object.

In order to obtain relatively linear motion, as opposed to the circular motion normally achieved by the "brute force" vibratory systems, vibrators in recent years, in certain applications, have utilized elastic members which are relatively rigid in the direction in which the vibratory motion is desired to be directed and which are flexible in the transverse direction so that little if any vibratory force is transmitted transversely. A typical example of such a structure is provided by the U.S. Pat. to Musschoot, No. 2,984,339 which discloses a vibratory feeder that includes a set of air springs for mounting the rotary vibrator structure to the conveyor structure.

An even more recent improvement has been the use of elastomeric members for mounting the exciting vibrator to the object to be vibrated. For example, the U.S. Pat. to Bruderlein, No. 3,417,630, Maeder et al., No. 3,212,629 and Makino, No. 3,396,294 all disclose rotary vibrator structures which are connected to the object to be vibrated by means of elastomeric blocks. In each of the afore-described patent structures, however, motion can only be directed in a generally linear path or in a circular or orbital path of a predetermined shape. It has been discovered that such basic vibratory movements are not necessarily the ideal method of vibrating an object particularly where the object to be vibrated is designed to feed material from one point to another or to filter or classify material. In these latter instances it is desirable to feed the material with a vibratory motion in the feeding structure with components in both the horizontal and vertical planes. Furthermore, it is extremely important that these components of the vibratory force be easily adjustable relative to one another since the material being handled, and thus the loading characteristics, may vary.

Summary of the Invention

With the present invention, a mounting for a rotary vibrator is provided which permits relatively independent adjustment of the transmitted vibratory force components in both the horizontal and vertical planes. The structure is basic and rather simple in nature utilizing the elastomeric blocks of the prior art. However, the blocks are mounted to support the rotary vibrator exciting structure in a unique manner whereby their positions, their sizes, and their number may be easily modified so as to achieve the desired control effect upon the resultant vibratory motion. Furthermore, special means are provided for achieving a predetermined compressive force upon the elastomeric blocks prior to the energization of the rotary vibrator or exciter structure. In this way, the force transmitted in compression through the elastomeric blocks relative to the force transmitted transversely to the blocks, can be carefully regulated to thereby control the path of movement of the vibrated structure.

In the structure of the present invention a two mass vibratory system is provided wherein the rotary vibrator exciter and its tubular mounting frame comprise one of the masses and the object to be vibrated, which is mounted upon a suitable isolating spring means, comprises the other of the masses. As is typical with such vibratory systems, the free swinging natural frequency of vibration of the system is modified to the desired value by modification of the interconnecting spring means. With the structure of the present invention the natural frequency can be changed to suit different load conditions by varying the compression upon the elastomeric blocks or, where larger changes in the natural frequency are desired, the number and/or positioning of the elastomeric blocks may be varied. By varying both the positioning and number of the blocks and the compression, the natural frequency of vibration of the two mass system can be modified without changing the path of the vibratory movement and vice versa.

BRIEF DESCRIPTION OF THE DRAWINGS

FIG. 1 is a side elevation of a vibratory screen conveyor utilizing the vibrator mounting of the present invention.

FIG. 2 is an end elevation of the vibratory screen conveyor shown in FIG. 1 with portions thereof being broken away for the purpose of clarity.

FIG. 3 is an enlarged isometric view of one of the force-transmitting elastomeric blocks of the vibrator mounting shown in FIGS. 1 and 2.

FIG. 4 is a side elevation of a second embodiment of a vibratory screen conveyor and vibrator mounting structure of the present invention.

FIG. 5 is a section taken along the line 5—5 of FIG. 4.

DESCRIPTION OF THE PREFERRED EMBODIMENT

The two mass vibratory system and particularly the vibrator mounting of the present invention will be described in connection with the vibrating of a conveyor screen structure 12 although it will be appreciated that the vibrator mounting structure may be used successfully in other two mass vibratory systems such as general purpose feeders, conveyors or separators.

The vibratory conveyor screen structure 12 generally comprises a pair of upright side plates 14 between which an inclined screen 16 is mounted. At each corner of the screen structure there is mounted a helical coil spring 18 for isolating the vibratory screen structure from the ground or floor surface without withdrawing any appreciable amount of energy from the vibrating system. The springs 18 are mounted by means of tubular members 20 which are bolted or otherwise secured to standards attached to the floor surface. A second set of tubular members 22 are attached to and depend from outwardly extending brackets 24 which are secured to the side plates 14 at the corners of the screen structure. Each tubular member 22 is aligned with one of the fixed tubular members 20, and both members extend within the coils of the associated spring 18 and normally spaced apart by a distance great enough to allow for sufficient compression of the spring during the vibratory movement of the screen structure.

In operation, when the rotary vibrator exciting mass 28 is provided with an oscillatory movement, the screen 16 is provided with an orbital motion of predetermined frequency and stroke. Material is deposited upon the upper end of the screen structure and is adapted to be moved to the lower end thereof. As is conventional in such vibrating screens, material of less than a certain diameter will pass through the screen to a collector structure (not shown) beneath the screen while the material which moves the length of the screen will be deposited into another collector or upon a conveyor belt (not shown).

The mounting for the rotary vibrator exciting structure 28 may be provided at various locations upon the vibrating screen structure. In the embodiment of the invention shown in FIGS. 1 and 2, the rotary vibrator structure is positioned above the screen structure so that the center of rotation of the rotary vibrator will be located in a plane which is normal to the screen structure and which is approximately at the mid-point of the screen structure. This location of the rotary vibrator will produce a vibratory movement of the screen structure relative to the ground or floor surface generally as shown by the arrows in FIG. 1 whereby material at the upper or feed end of the screen will be conveyed rapidly while material at the lower or discharge end of the screen will be conveyed relatively slowly in order to obtain an efficient separation of the material.

The mounting for the rotary vibrator assembly 28 includes a pair of side plates 30 which are welded or otherwise rigidly secured to the upper edge of each of the side plates 14 of the screen structure. Each of the plates 30 supports a U-shaped mounting bracket 32 which is comprised of a bottom wall 32a, a pair of side walls 32b and a pair of short, laterally-projecting flanges 32c at the upper edge of the side walls. Each bracket is rigidly secured within a cut-out portion 33 of the supporting side plate so as to extend laterally thereof, as best seen in FIG. 2. The rotary vibrator assembly includes a tubular mounting frame 34 of rectangular shape which is adapted to be resiliently supported within each of the mounting brackets so that it will extend laterally above the screen structure (FIG. 2).

An important feature of the present invention is the resilient support means for suspending the tubular mounting frame 34 within the U-shaped brackets 32. Since the brackets are rigidly connected to the screen structure, a two mass vibratory system is provided with the screen structure, including the mounting brackets 32, forming one mass and with the tubular mounting frame 34 and the rotary vibrator, which is attached thereto, forming a second mass. The resilient suspension for the tubular mounting frame thereby comprises a spring system which controls the magnitude of and the frequency of the vibratory forces transferred between said masses.

The resilient supporting means for the tubular mounting frame 34, in the embodiment of the invention illustrated in FIGS. 1 and 2, will be seen to comprise sets of eight elastomeric blocks 36 with one set mounting each end of the mounting frame. The blocks are arranged about the exterior surface of the frame at the corners thereof so that each corner is resiliently supported in both the vertical and the horizontal directions. A channel-shaped pressure plate 38 is secured across the top of each of the U-shaped mounting brackets 32 and is removably secured thereto by means of bolts 39 which are affixed to the flanges 32c at the upper edges of the brackets. The elastomeric blocks engaging the upper and lower generally horizontal faces 34a and 34b of the tubular frame 34 are secured by the bottom wall 32a of the mounting bracket and by the lower face of the overlying pressure plate 38 respectively. In order to secure those elastomeric blocks in engagement with the generally vertically oriented faces 34c and 34d of the tubular frame a pair of clamping plates 40 are provided each being positioned parallel to and spaced inwardly from one of the side walls 32b of the bracket. These clamping plates are in engagement with the elastomeric blocks, and they are secured in the desired adjustable position by means of internally threaded spacer blocks 42 which are secured to the side walls 32b of the mounting brackets 32 by means of screws 43. The location of the clamping plates 40 relative to the sides of the tubular frame and the side walls of the mounting bracket can be adjusted by means of adjustment bolts 45 which are threaded through the side walls of the mounting bracket and are located adjacent to the spacer blocks.

The elastomeric blocks 36 are initially placed in compression before vibratory forces are imparted to the tubular frame 34 with the amount of such compression being sufficient to assure that the blocks will remain in compression throughout the entire vibratory cycle of the rotary vibrator assembly 28. This compressive loading is accomplished with those blocks in engagement with the generally vertical faces of the tubular frame by adjusting the position of the bolts 45 to correctly position the clamping plates 40. When the correct lateral positioning of the clamping plates is obtained, spacer blocks 42 of the correct size are placed between the plates and the side walls 32b of the U-shaped mounting bracket and are secured in position by the screws 43. The adjustment bolts are then backed off out of engagement with the clamping plates so that they will not be damaged when vibratory motion is applied to the system. It will also be appreciated that those elastomeric blocks in engagement with the generally horizontal faces of the tubular frame will be placed in compression when the pressure plates 38 are secured to the flanges 32a of the mounting bracket by tightening down on the bolts 39. The magnitude of this compression can also be varied by inserting one or more shims 47 between the lower face of the pressure plate and the flanges 32c prior to the securing of the bolts 39.

The elastomeric blocks 36 are shown in detail in FIG. 3. Each block is comprised of a plurality of elongate block segments 51 which are spaced in the direction of the applied vibratory force by spacer plates 52 of a rigid, heat dissipating material such as aluminum; thus, heat is not permitted to build up to the point wherein it will adversely affect the operation of the vibratory structure or permanently damage the elastomers. The block segments are spaced in the direction transverse to the direction of applied vibratory forces, i.e., the shear direction, to decrease the stiffness in this direction so that the vibratory forces imparted to the screen structure will be determined almost solely by the amount of compression in the blocks in their normal or non-vibrating states. The lateral spacing of the block segments also provides ventilation and thereby further aids in heat dissipation. Each face of the blocks which is adapted to be secured to a flat surface for the transfer of vibratory forces is provided with a mounting plate 54 which extends laterally of the block along a pair of opposite side edges thereof so that the blocks can be securely fastened to the supporting structure by means of screws or the like, as shown in FIG. 3. The elastomeric blocks should have a substantial difference in spring rate in the compressive and lateral directions, and the stiffness ratio (compression-to-shear) should be in the range between 4 to 1 and 10 to 1.

The rotary vibrator structure is arranged to be mounted upon and within the tubular frame 34 with the rotary axis of the vibrator coinciding with the longitudinal axis of the frame so that the vibratory forces produced can be defined by a rotating force vector in a plane normal to the external faces of the frame and uniformly distributed on each opposite side of the frame. In order to provide such a rotating force vector, a rotary shaft 60 is mounted axially within the frame by means of conventional bearing blocks 62 and is provided with a plurality of eccentric weights 63. The shaft is arranged to be continuously rotated during operation of the screen conveyor by means of a motor 65 which is securely attached to the top of the tubular frame at the central portion thereof and which is connected to the shaft through a drive belt 66 extending through a slot 67 cut into the top face of the frame.

While a particular method of providing driving power for the rotary vibrator is shown in FIG. 1 it will be recognized that other methods might be adopted without departing from the principles of the present invention. For example, the motor may be mounted within the tubular frame member upon the same shaft which carries the eccentric weights, or the motor may be mounted externally of the vibratory system entirely and coupled to the eccentrically weighted shaft by means of flexible connectors.

As shown by the arrows in FIG. 1, the vibratory movement of the screen varies at different locations due to the rotational effect created by the isolating coil springs 18 and the fact that the center of gravity of the rotary vibrator structure is located above the plane of the screen. This has the effect of producing a rapid movement of the material along the screen at the feeding end and a slow movement of the material along the screen at the discharge end which may be of benefit in removing more fines from the material being conveyed. However, a uniform movement of material across the screen is possible by moving the center of gravity of the rotary vibrator assembly mass 28 so that it coincides with the center of gravity of the screen mass 12. In such a structure the tubular frame member would be resiliently supported at a lower elevation between the side plates 14 of the screen structure.

An important feature of the present invention is the fact that the vibratory system comprises a two mass system and the rotary vibrator mounting readily lends itself to adjustment in two relatively independent planes whereby the system can be initially tuned so that the feed of material across the screen will remain approximately constant under varying head loads. In order to accomplish this uniform feed of material, the free swinging natural frequency of vibration of the vibrator assembly mass 28 and the screen mass 12, as determined by the characteristics and the placement of the interconnecting elastomeric blocks 36, is set higher than the driving frequency, i.e., the frequency of rotation of the eccentrically weighted shaft 60. Under this design condition an increased load on the screen will lower the natural frequency of vibration in the vertical mode bringing it closer to resonance with the driving frequency and thereby tending to increase the vertical stroke, which action will counteract the decrease in vertical stroke due to material damping under increased load conditions.

An important advantage of the present invention over the rotary vibrator systems of the prior art is provided by the high degree of control of the direction of movement of material on the screen as determined by the selection of and the placement of the elastomeric blocks 36. In the embodiment of the invention shown in FIGS. 1 and 2, the elastomeric blocks 36 are placed uniformly about the tubular frame 34 that houses the vibrator assembly. This arrangement produces a vibratory motion at the center of the screen that is nearly circular indicating that both horizontal and vertical vibratory components are present in nearly the same degree. The vibratory force components in either direction can be modified by changing the compression of the elastomeric blocks in their non-vibrating condition and thereby altering the spring rate. This is accomplished by removing or adding shims 47 to alter the vibratory force component in the generally vertical direction and by tightening or loosening the adjustment bolts 45 to alter the vibratory force component in the generally horizontal direction. In addition to the foregoing adjustment method, certain of the elastomeric blocks can be removed to create a different vibratory movement of the screen. For example, if all of those elastomeric blocks in engagement with the generally vertical faces of the tubular frame 34 were to be removed, the resultant vibratory movement of the screen structure would be very nearly a straight line in a direction normal to the screen 16. By selectively replacing the removed elastomeric blocks and adjusting their compression, any elliptical orbit between the circular orbit of the described embodiment and a nearly straight line movement can be obtained in the screen structure. Similarly, by removing the elastomeric blocks engaging the generally horizontal faces of the tubular frame 34, the resultant vibratory movement of the screen structure can be made nearly a straight line movement in a direction parallel to the screen 16 except for a dip at the ends of the stroke and an inclined movement at the ends of the screen due to the rocking action created by the isolating springs 18.

A second embodiment of the invention is illustrated in FIGS. 5 and 4. In this embodiment, the screen structure, including side plates 14 and screen 16, is mounted in a horizontal plane with modified mounting brackets 24a and their depending tubular members 22 being provided at the corners of the structure to maintain the isolating coil springs 18 in vertical planes. The mounting for the rotary vibrator assembly 28a is provided at the discharge end of the screen structure and is basically the same as the vibrator mounting illustrated in FIGS. 1 and 2 including a pair of side plates 30 and U-shaped mounting brackets 32 straddling the screen structure and an elongated tubular mounting frame 34 carrying the rotary vibrator structure and extending between the mounting brackets. The mounting frame is retained in position by elastomeric blocks 36 similar to those illustrated in FIG. 3.

The use of the elastomeric blocks 36 in the embodiment of the invention illustrated in FIGS. 4 and 5 is different from that disclosed with respect to the embodiment of FIGS. 1 and 2 however. There are only four blocks used to mount each end of the tubular frame 34 within the associated mounting bracket 32, and they are arranged to be placed at diagonally opposite corners of the tubular frame on both the horizontal and the vertical faces thereof. Shortened clamping plates 40a are utilized to mount the blocks to the vertical faces of the frame, and bolts 45 and spacer members 42 are used for adjustment of the pre-set compression in the manner previously described. Pressure plates 38 and shims 47 are utilized to secure the blocks 36 to the horizontal faces of the tubular frame 34 in a similar manner to that previously described.

With the blocks 36 being used as shown in FIG. 4, the resultant vibratory movement of the screen structure is a narrow elliptical orbit at an angle to the horizontal in a direction defined by the broken line 72 connecting the supported corners of the tubular frame 34, such movement of the screen structure being shown by the arrows indicated in FIG. 4. In order to obtain a relatively pure elliptical orbit in the desired direction of movement of material on the screen 16, the center of gravity of the rotary vibrator assembly 28a, i.e., the rotary axis at the center of the tubular frame 34, and the center of gravity of the screen structure (including the vibrator mounting members 30 and 32) should lie in a plane at the same angle with the horizontal as the angle of the resultant vibratory motion. From the diagrammatic illustration of FIG. 4, it can be seen that this result is accomplished since the center of gravity of the screen lies on the line 72 which also passes through the rotary axis of the vibrator.

The driving means for the embodiment of the invention shown in FIGS. 4 and 5 is also different from that of the embodiment of FIGS. 1 and 2. A drive shaft 80 is mounted along the central axis of the tubular frame 34 by means of conventional bearing blocks 82 located at each end of the frame adjacent to the connecting spring means, i.e., the elastomeric blocks 36. Eccentric weights 84 are attached to each end of the shaft in order to provide rotating force vectors which are distributed independently at each end of the frame wherein vibratory motion is imparted to the supporting elastomeric blocks 36 through the adjacent bearing blocks 82. Each end of the shaft is then independently driven by means of a motor 86 mounted atop the adjacent pressure plate 38 and a drive belt 88 connected to the projecting end of the shaft 80. With the system of FIGS. 4 and 5, the exciting vibratory force is provided at each side of the structure and transmitted in the plane of the connecting spring blocks 36. While the rotary vibrator assembly has a common connecting shaft 80 to assure complete and proper phasing of the rotating weights, such an arrangement is not absolutely essential and the shaft 80 may be split so that each end thereof will operate completely independent of the other end.

From the foregoing description of the invention it will be recognized that a vibrator mounting of ready adaptability for a wide variety of operating conditions is provided. A plurality of spring blocks are provided to form a two mass vibratory system wherein the natural frequency of vibration may be adjusted independently in both the vertical and the horizontal directions. Furthermore, by shifting the position of or removing certain of the blocks the direction of the resultant vibratory motion can be easily changed, and any desired direction of vibratory motion can be obtained without resorting to a redesigning of the screen or vibrator structure.

Although the best mode contemplated for carrying out the present invention has been herein shown and described, it will be apparent that modification and variation may be made without departing from what is regarded to be the subject matter of the invention.

What is claimed is:

1. A vibrator mounting for a two mass vibratory system wherein one mass includes a vibrator of the rotary type and the other mass includes an object to be vibrated, said mounting comprising a tubular mounting frame having at least a portion thereof of generally rectangular shape with four external faces extending parallel to the longitudinal axis of said frame, means for mounting said rotary vibrator within said frame with the rotary axis of said vibrator extending axially of said frame whereby said vibrator produces a rotating force vector in a plane normal to said external faces of said frame, a mounting structure encircling said frame, means for rigidly connecting said mounting structure to the object to be vibrated, isolating spring means for mounting said object to be vibrated and permitting free vibratory movement thereof, and a plurality of elastomeric blocks all of which are mounted in compression between said portion of the tubular frame and said mounting structure with at least one block connecting each of said external faces of said frame to said mounting structure, said blocks being the only connecting means between said frame and said mounting structure whereby said vibratory forces are transmitted to said object to be vibrated through said blocks primarily in directions normal to said external faces of said portion of the frame.

2. A vibrator mounting according to claim 1 including means for varying the compressive force on said elastomeric blocks in their unvibrated states.

3. A vibrator mounting according to claim 2 wherein said means for varying the compressive force comprises a pair of plates mounted adjacent opposite faces of said frame for clamping the elastomeric blocks thereto, and an adjustable element securing each of said plates to the adjacent mounting structure for varying the spacing of the plates from said mounting structure and thereby varying the compressive force upon said blocks.

4. A vibrator mounting according to claim 1 wherein there are at least eight elastomeric blocks connecting said tubular frame to said mounting structure with two of said blocks being positioned at each corner of said frame and on adjacent faces of said frame whereby each corner is secured by a block in both the horizontal and the vertical planes.

5. A vibrator mounting according to claim 1 wherein there are four elastomeric blocks connecting said tubular frame to said mounting structure with a set of two blocks being located at each of a pair of diagonally opposite corners, each set of blocks including a block positioned in the horizontal plane and a block positioned in the vertical plane.

6. A vibrator mounting according to claim 1 wherein said mounting structure comprises a U-shaped bracket positioned in spaced relationship from three of the sides of said tubular frame, a pair of clamping plates positioned adjacent to and in spaced relationship with the sides of said bracket, said clamping plates serving to compress certain of said elastomeric blocks against opposite sides of said frame, and adjustable means mounting said clamping plates to the sides of said U-shaped bracket.

7. A vibrator mounting according to claim 6 including a pressure plate mounted across the top of said U-shaped bracket, said pressure plate serving to compress certain of said elastomeric blocks against opposite sides of said frame between said plate and said frame and between the bottom of said bracket and said frame.

8. A vibrator mounting according to claim 7 including means for varying the spacing between said pressure plate and said bracket to thereby vary the compressive force on certain of said elastomeric blocks.

9. A vibrator mounting according to claim 1 wherein each of said elastomeric blocks comprises a plurality of individual block segments spaced apart in the direction of the applied compressive force, and heat-dissipating rigid spacer members positioned between said block segments.

10. A vibrator mounting according to claim 9 wherein said spacer members are comprised of aluminum.

11. A vibrator mounting according to claim 9 wherein said elastomeric blocks further include individual block segments spaced apart in a direction transverse to the direction of the applied compressive force.

12. A rotary vibrator assembly according to claim 1 wherein said object to be vibrated comprises a screen, said tubular frame being mounted above said screen with the axis thereof extending transversely to the direction of movement of material on said screen, said mounting structure comprising a pair of upright support members mounted at the sides of said screen so as to surround said tubular frame.

13. A rotary vibrator assembly according to claim 12 wherein said means for continuously driving said shaft comprises a motor mounted upon the upper face of said frame between said upright support members.

14. A rotary vibrator assembly comprising a shaft, means for continuously driving said shaft, an eccentric weight connected to said shaft for rotation therewith, a tubular mounting frame having at least a portion thereof of generally rectangular shape with four external faces extending parallel to the longitudinal axis of said frame, means for mounting said shaft axially within said frame, a mounting structure encircling said frame and being arranged to be rigidly connected to an object to be vibrated, and a plurality of elastomeric blocks mounted in compression between said portion of the frame and said mounting structure with at least one block connecting each of the external faces of said frame to said mounting structure, said blocks being the only connecting means between said frame and said mounting structure whereby the vibratory forces generated by the rotation of said shaft are transmitted to said object to be vibrated through said blocks primarily in directions normal to said external faces of said portion of the frame.

15. A rotary vibrator assembly according to claim 14 wherein said means for continuously driving said shaft comprises a motor mounted upon said mounting structure.

16. A rotary vibrator assembly according to claim 14 wherein each end of said shaft is provided with a separate driving means and eccentric weight, and each end of said tubular frame includes a generally rectangular portion having a plurality of elastomeric blocks mounted in compression between said frame and said mounting structure.

* * * * *